Feb. 27, 1934. C. D. MATTIX 1,948,930
CONTROLLABLE HOOD FOR WIND STACKERS OF GRAIN SEPARATORS
Filed Sept. 8, 1932 2 Sheets-Sheet 1

INVENTOR.
Charles D. Mattix
ATTORNEY.

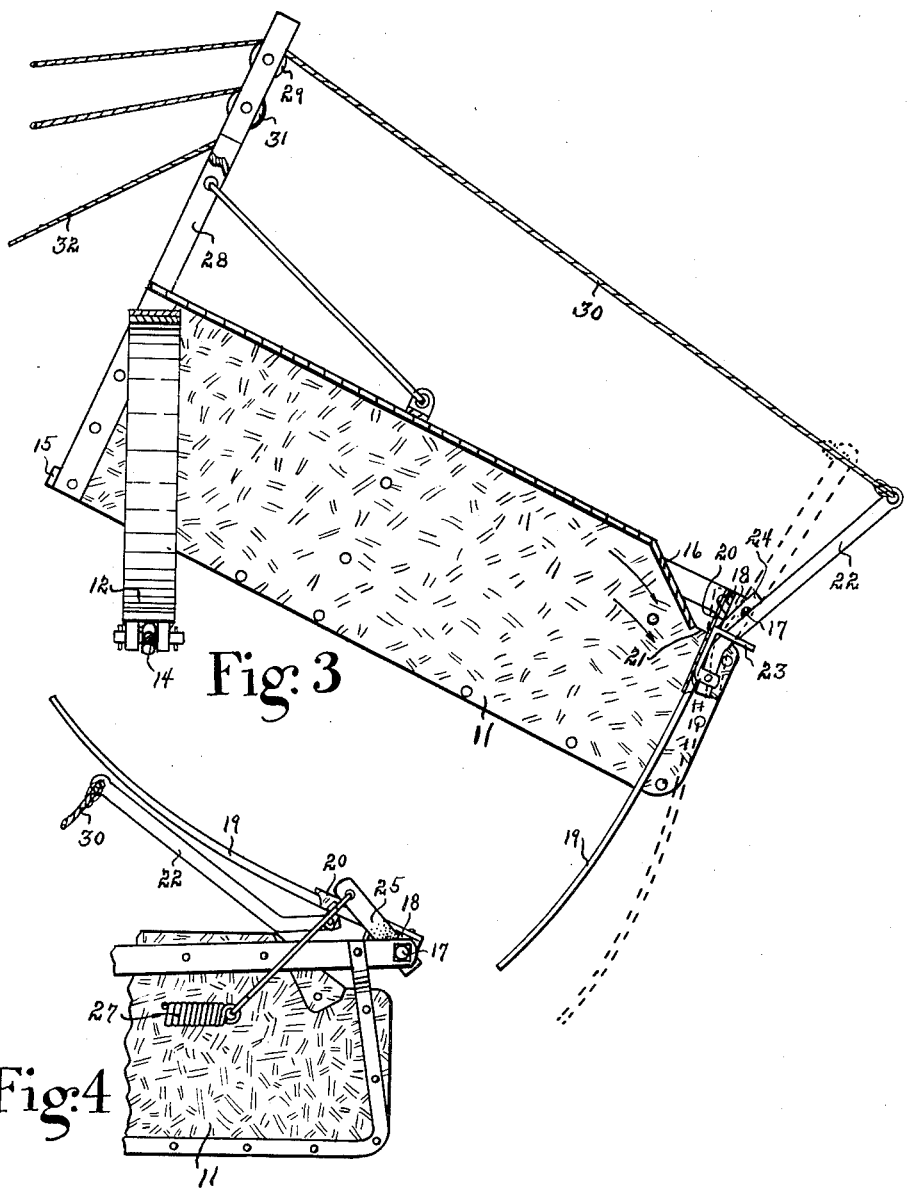

Patented Feb. 27, 1934

1,948,930

UNITED STATES PATENT OFFICE 1,948,930

CONTROLLABLE HOOD FOR WIND STACKERS OF GRAIN SEPARATORS

Charles D. Mattix, Beacon, Iowa

Application September 8, 1932
Serial No. 632,128

4 Claims. (Cl. 302—10)

The principal object of my invention is to provide a device for the wind stackers of grain separators that deposits the straw on the stack without the usual down draft of air and dust from the wind stacker tube.

A further object of this invention is to provide a baffle hood for the terminal end of wind stacker tubes of grain separators that is manually adjustable and always under the control of the operator, regardless of the elevation of the stacker tube.

A still further object of my invention is to provide an air and straw separating attachment for the terminal end of wind stacker tubes that is self-cleaning and non-clogging.

A still further object of my invention is to provide an air and straw separating device for the terminal end of wind stacker tubes that may be easily and quickly attached to or detached from a wind stacker tube of a grain separator.

A still further object of this invention is to provide an air and straw separating hood for the wind stackers of grain separators that may be quickly placed in an inoperative condition when desired.

A still further object of my invention is to provide an air and straw separating hood for the wind stackers of threshing machines that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 3 is a side sectional view of the device and more fully illustrates its interior construction.

Fig. 4 is a side view of the forward end portion of the device showing the tined grid swung upwardly and to the rear to an inoperative position.

Figure 1:
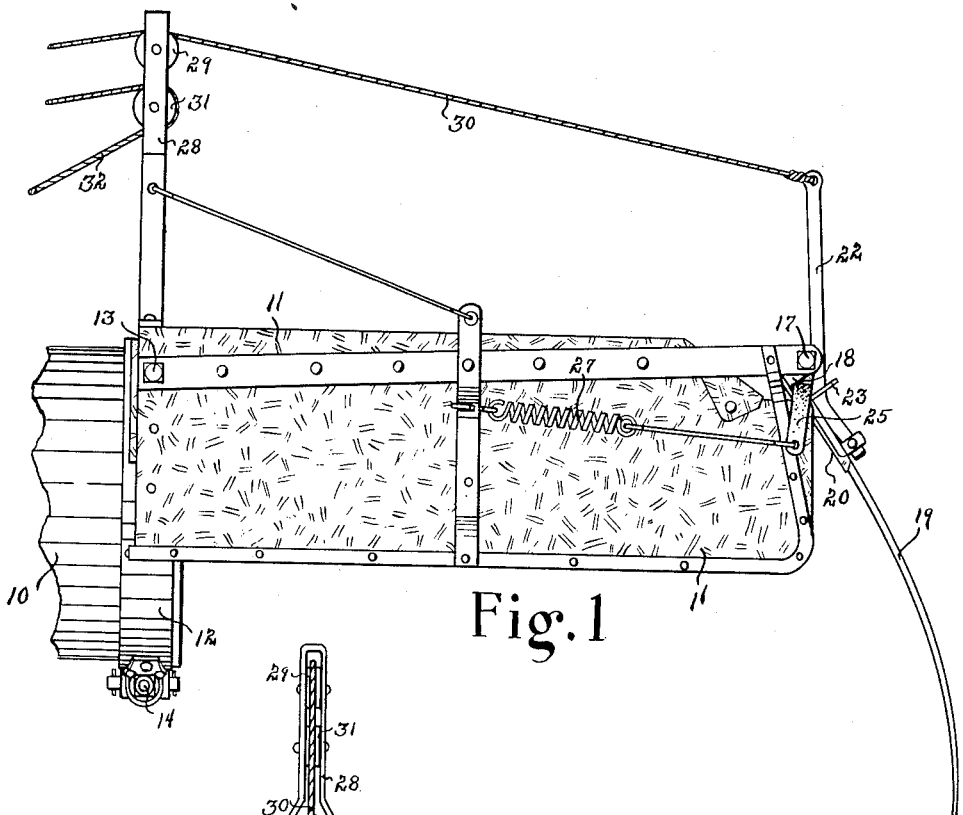
Fig. 1 is a side view of my complete device attached to a wind stacker tube and ready for use.

Most all present grain threshing machines using wind stacker tubes employ a hood or bill on the terminal end of the wind stacker tubes. These common and well known hoods or bill deflectors are usually impervious and guide all the straw, air current, dirt, chaff, and like downwardly onto the forming straw stack. This condition is very objectionable for two reasons; first, the strong air current which is dirt and chaff impregnated seriously affects the stack by its force and therefore makes the proper stacking of the straw by an individual impossible; and second, the dust and chaff laden air is highly disagreeable to the workman on the stack. I have overcome such objections by providing an air and straw separating hood that allows the air and dust to pass on in the general pointing direction of the stacker tube while retaining the desirable clean straw and allowing it to fall gently onto the forming stack where it may be properly built up by the workmen on the stack.

Referring to the drawings, I have used the numeral 10 to designate the wind stacker tube of an ordinary grain separator. It is to the terminal end portion of this tube that I secure my device which I will now describe.

The numeral 11 designates the inverted trough portion of the device open at both ends. This inverted trough portion may be made of any suitable sheet metal and properly reinforced by strap iron, and it is pivotally mounted by means of two side bolts 13 on an attaching band 12, which is detachably secured to the terminal end portion of the tube 10 by merely placing the band 12 around the tube, as shown in Fig. 3 and tightening the band-tightening bolt 14. By this construction, the trough portion 11 is hinged to the band 12 and may have its outer or discharge end lowered relative to the longitudinal axis of the tube 10, as shown in the drawings. A stop 15 is located at the lower rear corner of each of the two side walls of the trough member capable of engaging the rectangular frame secured to and embracing the band 12 and preventing the elevation of the trough 11 above the general longitudinal axis of the tube 10. To detach the device from a wind stacker tube, it is only necessary to loosen the single bolt 14.

Figures 2, 5:
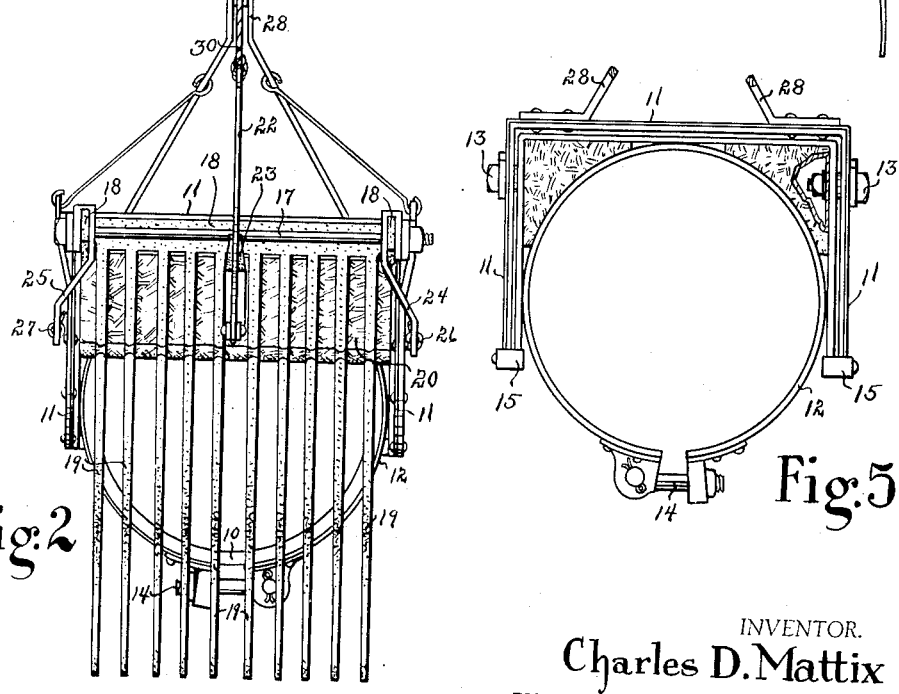
Fig. 2 is a front end view of my device secured on a wind stacker tube.
Fig. 5 is a rear end view of the device.

The numeral 16 designates a forwardly and downwardly extending baffle portion integrally formed on the top forward end of the trough 11, as shown in Fig. 3. This baffle portion is of minor proportions relative to the trough 11 proper. The numeral 17 designates a bolt rod secured to the forward upper end of the trough portion, as shown in Fig. 2. This bolt rod 17 extends completely across the trough and is positioned in advance and slightly above the forward marginal edge of the baffle 16.

The numeral 18 designates a bar having both ends bent at right angles to rotatably embrace the bolt rod 17. The numeral 19 designates a plurality of spaced apart and slightly curved downwardly extending tines on the bar 18. These plurality of tines when rotated to a position in front of the open forward end of the trough portion completely close the forward end of the trough portion and form the tined grid. The length of the downwardly and slightly inwardly curved tines is such that they terminate a substantial distance below the plane of the lower marginal edges of the trough portion, as shown in Fig. 1. The numeral 20 designates a baffle wall rigidly secured to the upper portions of the tines 19. This baffle wall 20 closes the entire upper forward portion of the trough portion when the tined grid is in a lowered normal position, as shown in Fig. 3, but has its lower marginal edge terminating a substantial distance above the lower plane of the trough. The numeral 21 designates a space opening between the forward marginal edge of the baffle portion 16 and the baffle wall 20 when the tined grid is in a lowered normal position. The numeral 22 designates an arm pivotally secured at its lower end to the central lower end portion of the baffle wall 20. This arm 22 normally extends a substantial distance above the upper plane of the trough portion when the tined grid is in a normal position, as shown in Fig. 1, and is prevented from lateral movement when in this position by engaging the forked member 23 secured to the upper central portion of the baffle wall 20. The numeral 24 designates a bracket arm having its secured end bent around the left end portion of the bar 18 that is rotatably mounted on the bolt rod 17. This portion of the bracket arm that is bent around the left end portion of the bar is also rotatably mounted on the bolt rod, as shown in Fig. 2.

The numeral 25 designates a duplicate bracket arm bent around the right end portion of the bar 18 that is rotatably mounted on the bolt rod. This bracket arm 25 is also rotatably mounted on the bolt rod in the same manner as the bracket arm 24. Both of these bracket arms 24 and 25 are bent outwardly to the outside of the trough portion and extend substantially downwardly when the tined grid is in a normal position. The numeral 26 designates a coil spring having one end secured to the left side of the trough portion and its other end operatively attached to the free end of the bracket arm 24. The numeral 27 designates a similar coil spring having one end secured to the right side of the trough portion and its other end operatively attached to the free end of the bracket arm 25. By this arrangement, the coil springs 26 and 27 will yieldingly hold the tined grid in a lowered normal position. The numeral 28 designates an upright member suitably secured to the rear top of the trough portion. The numeral 29 designates a pulley wheel rotatably mounted to the upper portion of the upright member 28. The numeral 30 designates a control cable engaging the pulley wheel 29 and having its forward end secured to the upper end of the arm 22. The numeral 31 designates a second pulley wheel secured to the upright member 28. The numeral 32 designates a cable embracing the pulley wheel 31 designed to have one end rigidly secured to a non-movable member such as the grain separator or tube 10 at a point in the rear of the inverted trough portion.

When the device is in operation the air under pressure, dirt, chaff, straw, and like will pass with great force from the wind stacker tube into the inverted trough portion 11. As the trough portion 11 is of substantial length and open at its bottom, the force of this material reaching the forward end of the device will be greatly reduced.

The reason for this is that a substantial amount of the air under pressure may pass freely from the open bottom of the trough while the heavier material such as straw, chaff, dirt, and like, will be carried by momentum to the forward end portion of the device. This action is also encouraged by the diameter of the tube 10 being greater than the height of the side walls of the inverted trough member. Furthermore, the rectangular construction of the inverted trough member tends to flatten and distribute the material discharging from the tube 10. Upon reaching the forward end portion of the device the remaining air current, chaff, dirt, straw and like will be guided forwardly and slightly downwardly by the baffle 16. Much of the straw, dust, chaff, and like will next engage the baffle wall 20, which is of impervious material and substantially perpendicular to the side walls of the inverted trough portion when the tined grid is in a normal position. From engagement with this baffle wall 20 the air under pressure, straw, dirt, chaff, and like will pass downwardly and engage the inner sides of the downwardly and slightly inwardly curved tines 19 of the tined grid. As the tines 19 are spaced apart, the tined grid will not be impervious to the air, dust, and like, which will therefore pass on in the general longitudinal direction of the hood portion without serious interference. The curved tines 19, however, will retain the desirable straw from passing through the tined grid and this straw will drop gently downwardly from the tines to the forming stack without the usual air blast. By the tines being curved downwardly and inwardly, they will have more effect in retaining the desired straw even when the tined grid is moved a substantial distance outwardly from its normal position.

By pivotally securing the tined grid at its upper end a slight distance in the rear of the plane of the forward side marginal edges of the trough member, the tined grid can move outwardly a substantial distance before the baffle wall 20 is swung clear of the forward end of the trough portion. If, for any reason, a substantial amount of straw engages and clogs on the inner side of the tined grid, the air pressure engaging this mass will force the tined grid outwardly against the action of the coil springs 26 and 27, thereby causing the mass of straw to drop downwardly and thereby automatically clean the tined grid. The rectangular construction of the inverted trough portion also aids in eliminating any clogging action in the trough member or on the tines as air passageways are substantially increased in the trough portion by virtue of the additional corner spaces in the trough portion. The space opening 21 permits both undesirable air and dust to escape upwardly between the baffle 16 and baffle wall 20.

If the wind stacker tube 10 is substantially horizontal the trough portion 11 should also be adjusted to substantially a horizontal position. However, as the forming stack increases in height and the tube 10 is elevated it is apparent that the trough portion 11 should be adjusted accordingly. Other conditions such as wind may also make it necessary to adjust the position of the trough portion 11 relative to the tube 10. This may be accomplished easily by tightening or loosening the free end of the cable 32 and then rigidly securing this free end of the cable after the proper adjustment is obtained. By the use of this cable and the adjusting of the trough portion the straw may be deposited directly downwardly on the stack at any point, regardless of the position of the tube 10 or height of the stack.

In normal conditions the cable 30 would be left in a slack condition and the tined grid permitted to seek its own position from the force of the air and straw. If, however, for any reason it is desired to limit the inward swinging movement of the tined grid this cable may be tightened accordingly and fastened.

If it is desired to place my device in an inoperative condition it is merely necessary to pull the cable 30 to the rear. This action will be exerted on the upper end of the arm 22 and will swing the tined grid completely up from in front of the forward end of the trough member and to the top of the trough member, as shown in Fig. 4. This movement of the tined grid will cause the bracket arms 24 and 25 to toggle with the action of the coil springs 26 and 27. With the free ends of the bracket arms 24 and 25 extending upwardly and rearwardly, the coil springs will yieldingly hold the tined grid in an inoperative position above the trough member until the tined grid is again manually placed in an operative position in front of the trough portion.

From the foregoing, it will readily be seen that I have provided an attachment for the terminal end of wind stacker tubes that separates the desirable straw from the air blast and causes the straw to gently fall to the forming stack. With the straw thus falling on the forming stack without force and without the air blast and dirt, the workman on the stack can easily and properly distribute the straw and build the stack.

Some changes may be made in the construction and arrangement of my improved controllable hood for wind stackers of grain separators without departing from the real spirit and purpose of my invention, and it is my intention to cover by my claims any modified forms of structure or use of mechanical equivalents which may be reasonably included within their scope.

I claim:

1. In a device of the class described, an inverted trough member open at both ends, a means for securing the rear end of said trough member to the terminal end portion of a tube, a downwardly and forwardly extending baffle member in the forward end portion of said trough member, a tined grid in the forward end portion of said trough member, and a baffle wall secured to the upper portions of said tined grid normally closing the extreme upper portion of the open forward end of said trough member.

2. In a device of the class described, an inverted trough member open at both ends, a means for securing the rear end of said trough member to the terminal end portion of a tube, a downwardly and forwardly extending baffle member in the forward end portion of said trough member, a tined grid in the forward end portion of said trough member, and a baffle wall secured to the upper portions of said tined grid normally closing the extreme upper portion of the open forward end of said trough member; said downwardly and forwardly extending baffle member and said baffle wall spaced apart to provide a slot opening.

3. In a controllable hood for wind stacker tubes of grain separators, an inverted trough member open at both ends, a means for hinging the rear end portion of said inverted trough member to a wind stacker tube, a tined grid pivotally secured at its upper portion in the forward end portion of said inverted trough member, and a means for pivotally adjusting the inverted trough member relative to the wind stacker tube.

4. In a controllable hood for wind stacker tubes of grain separators, an inverted trough member open at both ends, a means for hinging the rear end portion of said inverted trough member to a wind stacker tube, a downwardly and forwardly extending baffle member in the forward end portion of said trough member, a tined grid in the forward end portion of said trough member, a substantially flat baffle wall rigidly secured to the upper portions of said tined grid normally closing the extreme upper portion of the open forward end of said trough member, and a cable element for holding said inverted trough member in different positions of its swinging movement relative to said wind stacker tube.

CHARLES D. MATTIX.